(12) United States Patent
Zhang et al.

(10) Patent No.: US 11,461,276 B2
(45) Date of Patent: *Oct. 4, 2022

(54) METHOD AND DEVICE FOR DEDUPLICATION

(71) Applicant: EMC IP Holding Company LLC, Hopkinton, MA (US)

(72) Inventors: Leon Zhang, Beijing (CN); Henry Hao Fang, Beijing (CN); Chen Gong, Beijing (CN); Lester Ming Zhang, Beijing (CN); Yongli Wang, Beijing (CN); Huan Chen, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/096,237

(22) Filed: Nov. 12, 2020

(65) Prior Publication Data

US 2021/0064578 A1 Mar. 4, 2021

Related U.S. Application Data

(63) Continuation of application No. 15/992,483, filed on May 30, 2018, now Pat. No. 10,891,261.

(30) Foreign Application Priority Data

Jun. 2, 2017 (CN) .......................... 201710408364.7

(51) Int. Cl.
*G06F 16/174* (2019.01)
*G06F 13/16* (2006.01)

(52) U.S. Cl.
CPC ...... *G06F 16/1748* (2019.01); *G06F 13/1668* (2013.01); *G06F 16/1744* (2019.01)

(58) Field of Classification Search
CPC .......................... G06F 16/1748; G06F 16/1744
(Continued)

(56) References Cited

U.S. PATENT DOCUMENTS 8,392,384 B1 * 3/2013 Wu ...................... G06F 16/1748
707/693
8,407,186 B1 * 3/2013 Cremelie ............ G06F 16/1748
707/664

(Continued)

FOREIGN PATENT DOCUMENTS

CN 101957836 1/2011
CN 102609360 7/2012
(Continued)

*Primary Examiner* — Muluemebet Gurmu
(74) *Attorney, Agent, or Firm* — BainwoodHuang

(57) ABSTRACT

Embodiments of the present disclosure provide a method and device for deduplication. Specifically, the method may comprise obtaining a property of a file stream, the property of a file stream including a file type or a magic number identifying a format of a protocol or a file. The method further includes in response to receiving an I/O request for a data block of the file stream, assigning a deduplication level to the I/O request based on the property of the file stream. Moreover, the method further includes deduplicating the data block of the file stream based on the deduplication level assigned to the I/O request. In addition, a corresponding device and computer program product are provided.

15 Claims, 5 Drawing Sheets

(58) Field of Classification Search
USPC .......................................................... 707/692
See application file for complete search history.

(56) References Cited

U.S. PATENT DOCUMENTS

| | | | |
|---|---|---|---|
| 9,122,697 | B1 | 9/2015 | Bono et al. |
| 10,614,038 | B1 | 4/2020 | Armangau et al. |
| 10,635,315 | B1 | 4/2020 | Armangau et al. |
| 10,678,435 | B2 | 6/2020 | Swift |
| 2010/0313040 | A1* | 12/2010 | Lumb .................... G06F 3/0623 713/193 |
| 2016/0162414 | A1* | 6/2016 | Nayak .................. G06F 12/0891 711/141 |
| 2017/0364530 | A1* | 12/2017 | Mallaiah ............. G06F 16/1748 |

FOREIGN PATENT DOCUMENTS

| | | |
|---|---|---|
| CN | 103729429 | 4/2014 |
| CN | 104484132 | 4/2015 |
| CN | 104871155 | 8/2015 |
| CN | 105094709 | 11/2015 |
| CN | 105824574 | 8/2016 |
| CN | 106020722 | 10/2016 |

* cited by examiner

METHOD AND DEVICE FOR DEDUPLICATION

RELATED APPLICATIONS

This application claims priority from U.S. patent application Ser. No. 15/992,483, filed on May 30, 2018 at the United States Patent Office, titled "METHOD AND DEVICE FOR DEDUPLICATION" the contents of which is herein incorporated by reference in its entirety, which claims priority from Chinese Patent Application Number CN201710408364.7, filed on Jun. 2, 2017 at the State Intellectual Property Office, China, titled "METHOD AND DEVICE FOR DEDUPLICATION" the contents of which is also herein incorporated by reference in its entirety.

FIELD

Embodiments of the present disclosure generally relate to the field of storage, and more specifically, to a method, device and computer program product for deduplication.

BACKGROUND

In today's society, computer system is commonplace. A computer system may be found in the workplace, at home or at school. The computer system may include a data storage system or a disk storage system for processing and storing data. One such processing is data deduplication which refers to the reduction and/or elimination of redundant data. In the data deduplication processing, repetitive duplicates of data are reduced or eliminated, thereby leaving a minimum number of redundant duplicates, or a single duplicate of data. The use of deduplication processing provides various benefits, such as a reduction in the required storage capacity and a need for reduction of network bandwidth. Due to these and other benefits, deduplication has emerged as a highly important technical field in computer storage system in recent years.

As users can own, create, modify and/or delete the containers and objects on the storage space, access to the storage space through I/O request has increased significantly. Users for such storage service typically perform these operations to the owned storage space with the aid of an application programming interface (API) provided by the storage service provider. While it is useful to provide API to users, using API to perform operations to the storage service has raised additional issues to the service provider in the field of data deduplication. Therefore, there is a need for the storage service provider to use deduplication technology to reduce the consumption of the storage service space.

SUMMARY

Embodiments of the present disclosure provide a method, device and computer program product for deduplication.

In accordance with an aspect of the present disclosure, there is provided a method of deduplication. The method may comprise: obtaining a property of a file stream, the property of the file stream may include file type or magic number identifying a format of a protocol or a file. The method may further include in response to receiving an I/O request for a data block of the file stream, assigning a deduplication level to the I/O request based on the property of the file stream. Moreover, the method may further include deduplicating the data block of the file stream based on the deduplication level assigned to the I/O request.

In an example embodiment, assigning a deduplication level to the I/O request may comprise determining whether the file stream is compressed based on the property of the file stream; and assigning the deduplication level based on the determining.

In an example embodiment, assigning the deduplication level based on the determining may comprise: in response to determining that the file stream is compressed, assigning a first deduplication level to the I/O request; in response to failing to determine whether the file stream is compressed, assigning a second deduplication level to the I/O request; and in response to determining that the file stream is not compressed, assigning a third deduplication level to the I/O request.

In an example embodiment, deduplicating the data block of the file stream may comprise: in response to the assigned deduplication level being the first deduplication level, skipping deduplication of the data block of the file stream; in response to the assigned deduplication level being the second deduplication level, deduplicating the data block of the file stream based on a state of an available computing resource; and in response to the assigned deduplication level being the third deduplication level, deduplicating the data block of the file stream.

In an example embodiment, deduplicating the data block of the file stream based on a state of an available computing resource may further comprises: in response to an amount of the available computing resource being above a predetermined threshold, deduplicating the data block of the file stream; and in response to the amount of the available computing resources being below the predetermined threshold, skipping deduplication of the data block of the file stream.

In an example embodiment, deduplicating the data block of the file stream comprises: in response to the deduplication level assigned to the I/O request being the second deduplication level, skipping deduplication of the data block of the file stream regardless of a state of an available computing resources.

In an example embodiment, the method may further comprise: after assigning the deduplication level to the I/O request, calculating a fingerprint of the I/O request, the fingerprint identifying the data block for the I/O request; and storing the fingerprint in a cache.

In an example embodiment, the method may further comprise: in response to a fingerprint of a subsequent I/O request after the I/O request hitting the fingerprint stored in the cache, assigning a deduplication level to the subsequent I/O request, the assigned deduplication level being the same as that of the I/O request corresponding to the hit fingerprint in the cache.

In accordance with a second aspect of the present disclosure, there is provided an electronic device, comprising: a processor and a memory coupled to the processor and having instructions stored thereon which, when executed by the processor, cause the device to: obtain a property of a file stream, the property of the file stream includes file type or a magic number identifying a format of a protocol or a file; in response to receiving an I/O request for a data block of the file stream, assign a deduplication level to the I/O request based on the property of the file stream; and deduplicate the data block of the file stream based on the deduplication level assigned to the I/O request.

In accordance with a third aspect of the present disclosure, there is provided a computer program product being tangibly stored on a non-transient computer readable medium and comprising machine executable instructions which, when executed, causing a machine to perform steps of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description of example embodiments of the present disclosure with reference to the accompanying drawings, the above and other objectives, features, and advantages of the present disclosure will become more apparent. In example embodiments of the present disclosure, the same reference signs usually refer to the same components.

DETAILED DESCRIPTION OF EMBODIMENTS

Figure 1:
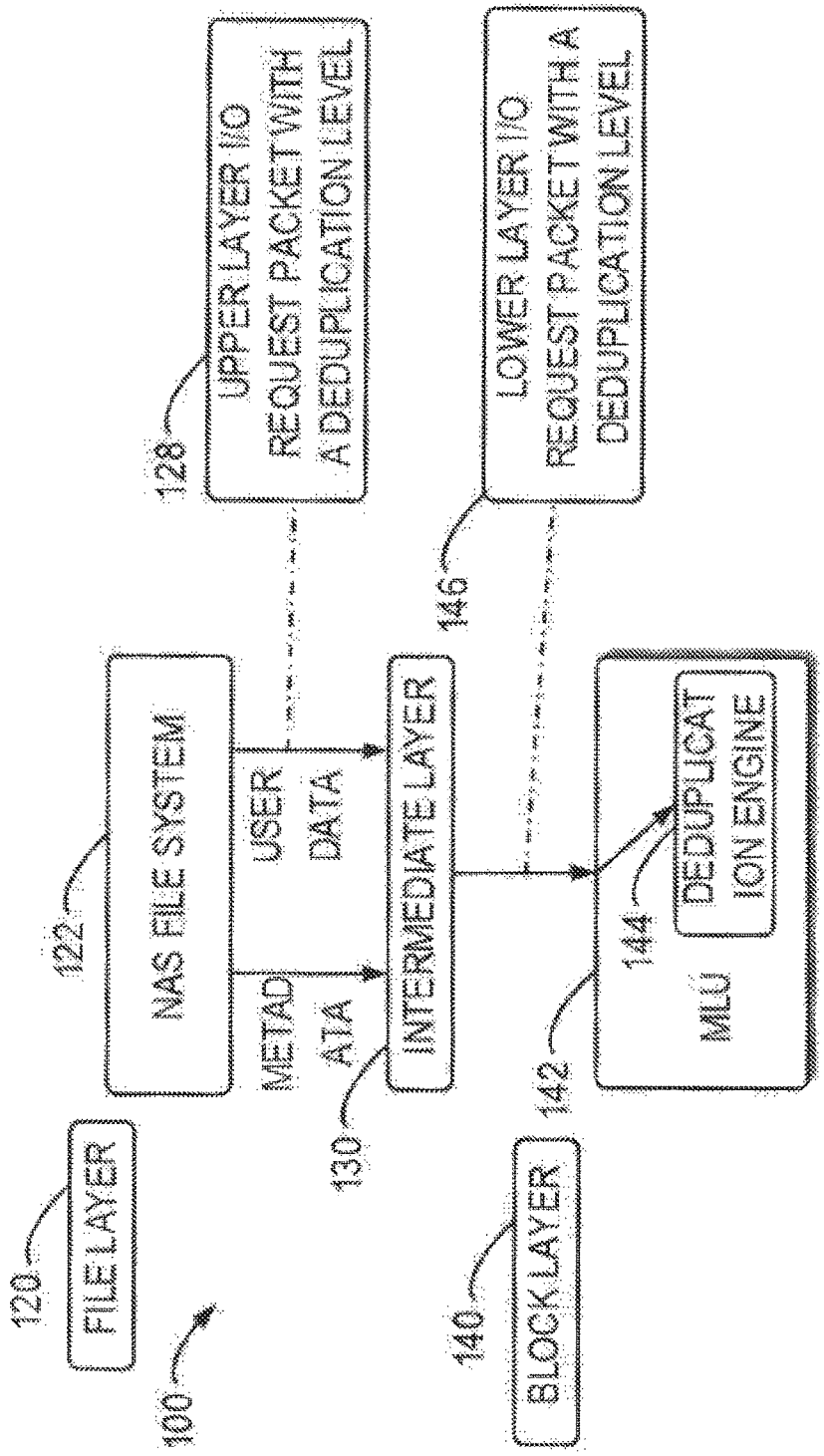
FIG. 1 is a block diagram illustrating an example system 100 for deduplication in accordance with embodiments of the present disclosure.

Preferred embodiments of the present disclosure will be described in the following text in greater detail with reference to the drawings. Although preferred embodiments of the present disclosure are displayed in the drawings, it is to be understood that the present disclosure can be implemented in various manners, not limited to the embodiments illustrated herein. On the contrary, these embodiments are provided to make the present disclosure more thorough and complete and convey the scope of the present disclosure completely to those skilled in the art.

As used herein, the term "includes" and its variants are to be considered as open-ended terms that mean "includes, but is not limited to." The term "or" is to be understood as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least another embodiment." Terms "first," "second" and others can denote different or identical objects. The following text may also contain other explicit or implicit definitions.

FIG. 1 is a block diagram illustrating an example system 100 for deduplication in accordance with embodiments of the present disclosure. It is to be understood that the structure and function of the example system 100 are described only for illustrative purpose, rather than to imply any limit to the scope of the present disclosure. Embodiments of the present disclosure may be embodied in different structures and/or functions.

As illustrated in FIG. 1, the example system 100 may include a file layer 120 as upper layer, an intermediate layer 130 and a block layer 140 as lower layer, where the file layer 120 may further include a network attached storage (NAS) file system 122 and be used to access upper layer data, the intermediate layer 130 may be used to complete the transfer of I/O request between the file layer 120 and the block layer 140, and the block layer 140 may further include a mapping logic unit (MLU) 142 and be used for the storage of lower layer data. Besides, the NAS file system 122 may be used to manage metadata and user data, where the metadata may be identifier information indicating, such as, timestamp of data, length of data, starting position of data and the like, while user data may be data content for access by the user, and when the user accesses user data, the NAS file system 122 assigns a deduplication level to I/O request packet of the user based on properties of user data. The upper layer I/O request packet 128 with a deduplication level may be transferred by the intermediate layer 130 to a lower layer I/O request packet 146 with a deduplication level for deduplicating data blocks mapped by user data in the MLU 142 by the deduplication engine 144 included in MLU 142, where the upper layer I/O request packet 128 and the lower layer I/O request packet 146 have the same deduplication level. It is to be understood that the example layers or modules described herein are only used to facilitate those skilled in the art to understand the idea of the present disclosure, rather than to limit the scope of the present disclosure in any manner. Besides, more or better packets or modules may be included in other embodiments.

Figure 2:
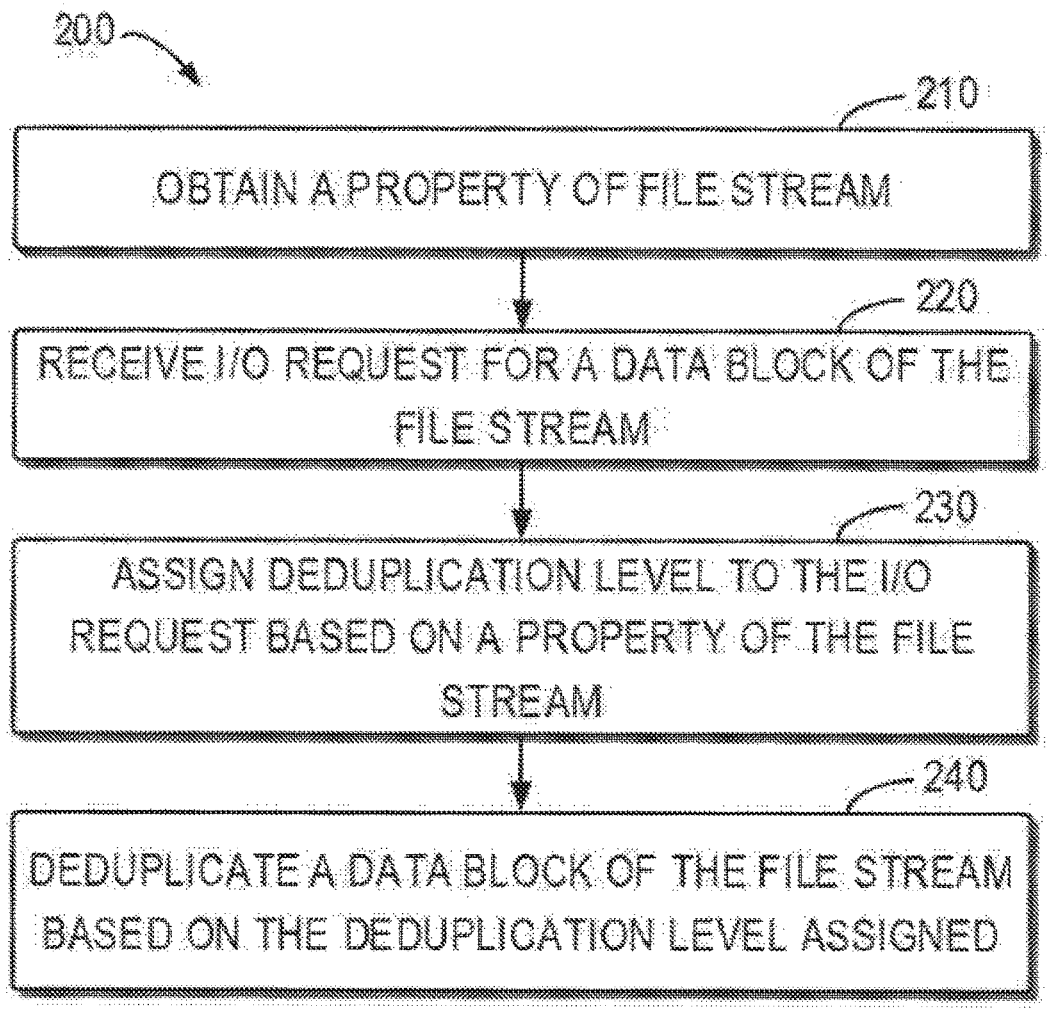
FIG. 2 is a flowchart illustrating an example method 200 for deduplication in accordance with embodiments of the present disclosure.

Reference will be made to FIG. 2 to describe example embodiments of the present disclosure in greater detail. FIG. 2 is a flowchart illustrating an example method 200 for deduplication in accordance with embodiments of the present disclosure. For example the method 200 may be performed by the example system 100 for deduplication shown in FIG. 1. It is to be understood that method 200 may further include additional steps not shown and/or omit the shown steps. The scope of the present disclosure is not limited in this regard.

As shown in FIG. 2, at 210, a file stream's property is obtained. In some embodiments, this may be implemented by the NAS file system 122. For example, the NAS file system 122 may obtain properties of user data, where the properties may include file type or magic number identifying format of the protocol or file. At 220, an I/O request for an data block of the file stream is received. In some embodiments, when the user accesses user data, the NAS file system 122 receives I/O request for data blocks of user data.

Figure 3:
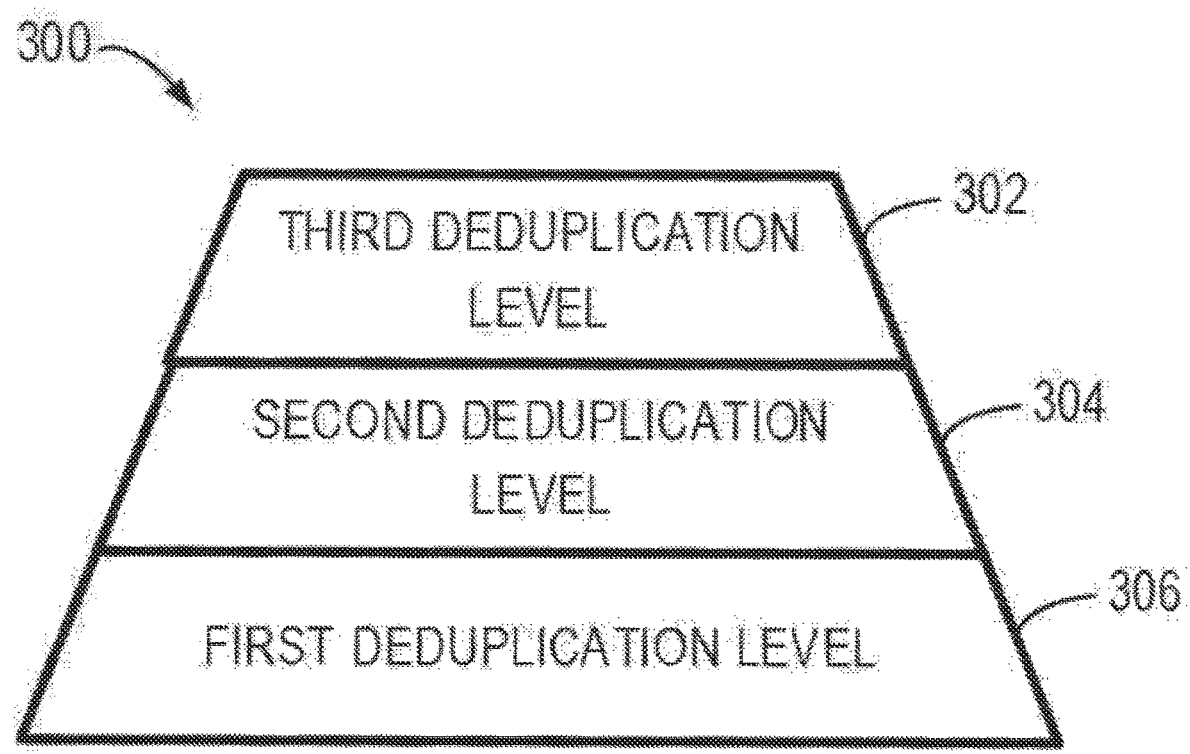
FIG. 3 illustrates an example deduplication level 300 in accordance with embodiments of the present disclosure.

At 230, based on the property of the file stream, a deduplication level is assigned to the I/O request. In some embodiments, the NAS file system 122 may assign a deduplication level to the I/O request for data blocks of user data based on the properties of user data. In particular, NAS file system 122 may determine whether user data are compressed based on properties of user data and then assign a deduplication level based on the result of the determination. For example, as shown in FIG. 3, in some embodiments, if the NAS file system 122 determines that user data are compressed, a first deduplication level 306 is assigned to the I/O request (for instance, the upper layer I/O request packet in FIG. 1) for data blocks of the user data. If the NAS file system 122 fails to determine whether user data are compressed, a second deduplication level 304 is assigned to the I/O request for data blocks of the user data. If the NAS file system 122 determines that user data are not compressed, a third deduplication level 302 is assigned to the I/O request for data blocks of the user data. As described above, if it is determined that user data are not compressed, a higher deduplication level will be assigned to indicate that the deduplication effect of the user data is obvious. Subsequently, under limited computing resources, user data with higher deduplication level will be deduplicated with higher priority so as to save computing resources and improve performance of the processor. It is to be understood by those skilled in the art that the above compression may include lossy compression and/or lossless compression.

As stated above with respect to FIG. 1, the upper layer I/O request packet 128 with a deduplication level may be transferred via the intermediate layer 130 to a lower layer I/O request packet 146 with a deduplication level for deduplicating data blocks mapped by the user data in the MLU 142 by the deduplication engine 144 included in MLU 142, where the upper layer I/O request packet 128 and the lower layer I/O request packet 146 have the same deduplication level. At 240, data blocks of the file stream are deduplicated based on the assigned deduplication level.

In some embodiments, the deduplication engine 144 may deduplicate data blocks mapped by user data in MLU 142 through the lower layer I/O request packet 146 with a deduplication level at the block layer 140. Specifically, if the deduplication level carried by the lower layer I/O request packet 146 is the first deduplication level 306, the deduplication engine 144 may skip the deduplication of data blocks mapped by the user data in MLU 142, that is, deduplication effect of this kind of data blocks is not obvious, and skipping the deduplication may save computing resources. If the deduplication level carried by the lower layer I/O request packet 146 is the second deduplication level 304, the deduplication engine 144 may deduplicate data blocks mapped by the user data in the MLU 142 based on the state of available computing resources, because such type of data blocks are fewer in actual application, and then it may determine whether deduplication is performed based on the state of the available computing resources. If the deduplication level carried by the lower layer I/O request packet 146 is the third deduplication level 302, the deduplication engine 144 may deduplicate data blocks mapped by the user data in MLU 142, that is, the deduplication effect of this type of data blocks is obvious, and limited computing resources should be used for this kind of data blocks to save storage resources. As stated above, the limited computing resources can be effectively used for user data with obvious deduplication effect by classifying user data beforehand based on the deduplication level and then deduplicating user data with higher deduplication level.

It should be noted that in the embodiments described above, if the deduplication level carried by the lower layer I/O request packet 146 is the second deduplication level, the deduplication engine 144 deduplicates data blocks mapped by user data in MLU 142 based on the state of available computing resources. Alternatively, in other embodiments, in response to the deduplication level carried by the lower layer I/O request packet 146 being the second deduplication level, the deduplication engine 144 may skip deduplication of data blocks mapped by user data in MLU 142 without considering the state of the computing resources. Generally, the second deduplication level is a small probability event because the NAS file system 122 usually can determine whether user data are compressed by acquiring properties of user data.

Additionally or alternatively, in some embodiments, after assigning a deduplication level to the upper level I/O request 128, the NAS file system 122 calculates the fingerprint of the upper layer I/O request 128 which identifies data blocks for the upper layer I/O request 128 and stores the calculated fingerprint in a memory, such as a cache. When the user continues to access the NAS file system 122, the fingerprint of subsequent I/O request is calculated and compared with the fingerprint stored previously in the cache. If hit, the NAS file system 122 assigns, to subsequent I/O request, the same deduplication level as that of the I/O request corresponding to the hit fingerprint in the cache. Additionally or alternatively, if miss, the NAS file system 122 may assign a deduplication level to the subsequent I/O request based on the above manner and store the fingerprint of the subsequent I/O request in the cache. By using a cache to store the fingerprint of the known I/O request, it is possible to determine the deduplication level of the subsequent I/O request more quickly, thereby improving the performance of the processor.

Figure 4:
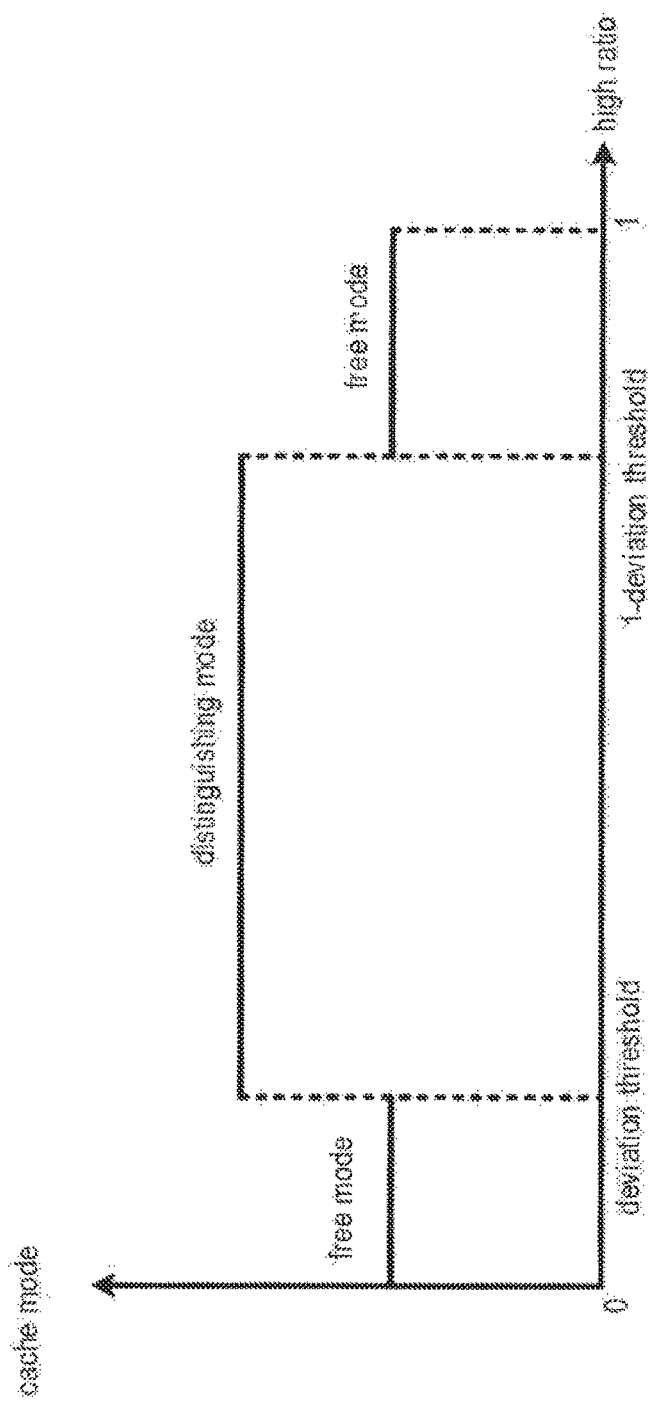
FIG. 4 illustrates a usage mode of cache for storing fingerprints in accordance with alternative embodiments of the present disclosure.

FIG. 4 illustrates a usage mode of a cache for storing fingerprints in accordance with alternative embodiments of the present disclosure. In actual application, as the limited storage space of the high-speed cache, it is expected that the fingerprints for more I/O requests with higher duplication level (such as third deduplication level 302) be stored in the high-speed cache. This is because the higher the deduplication level carried by the I/O request is, the greater the possibility for the data blocks for the I/O request to be deduplicated will be.

To solve the above problem, in some embodiments of the present disclosure, the cache that may support fingerprint storage has two modes: free mode and distinguishing mode. In the distinguishing mode, when the cache has been full and some fingerprints have to be substituted, the cache keeps the ratio of the fingerprints for each deduplication level, for example, 8 (third deduplication level): 2 (first deduplication level and second deduplication level). In the free mode, the cache may store the fingerprint of a deduplication level without maintaining the ratio of the fingerprint for each deduplication level. For example, the high-speed cache is allowed to store the fingerprint of only one deduplication level. The mode switching algorithm of the usage mode for the cache may be based on statistics and represented in the form of pseudo code as follows:

```
{
    for each defined_interval (e.g. 30s) {
        //high level: third deduplication level;   total level: first deduplication level
+second deduplication level+ third deduplication level
        high_ratio = (high level's FP's number/total levels' FP's number);
        //deviation_threshold may be defaulted to 5%
        if (high_ratio > deviation_threshold)) AND (high_ratio < (1 − deviation_threshold)),
            going to distinguishing_mode;
        else
            going to free_mode;
    }
}
```

The deviation_threshold is defaulted to be 5% in the above example. However, this is only example and any other proper value is also possible.

Figure 5:
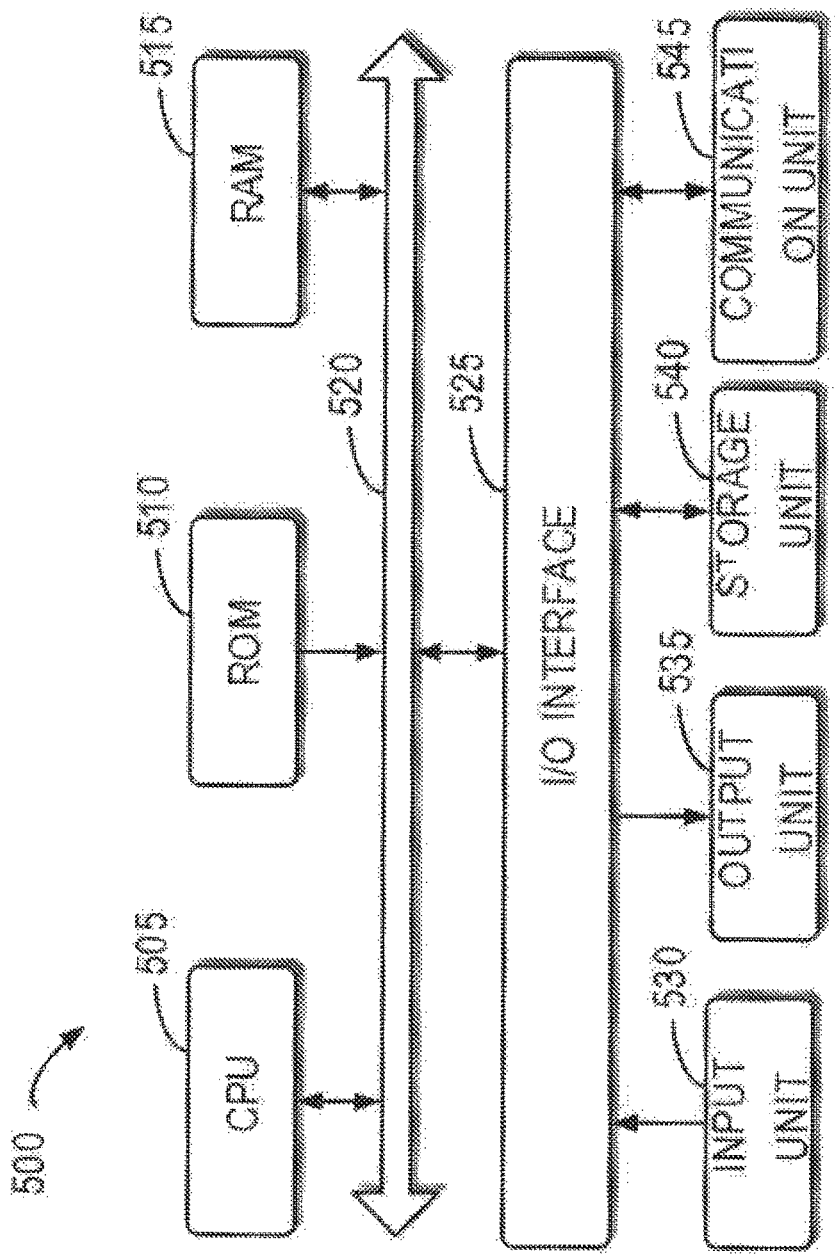
FIG. 5 is a schematic block diagram illustrating an example device 500 that can be used to implement embodiments of the present disclosure.

FIG. 5 is a schematic block diagram illustrating an example device 500 that can be used to implement embodiments of the present disclosure. As shown in the figure, the device 500 includes a central processing unit (CPU) 505, which can perform various appropriate actions and processing based on the computer program instructions stored in a read-only memory (ROM) 510 or the computer program instructions loaded into a random access memory (RAM) 515 from a storage unit 540. The RAM 515 also stores all kinds of programs and data required by operating the storage device 500. CPU 505, ROM 510 and RAM 515 are connected to each other via a bus 520, to which an input/output (I/O) interface 525 is also connected.

A plurality of components in the device 500 are connected to the I/O interface 525, including: an input unit 530, such as keyboard, mouse and the like; an output unit 535, such as various types of displays, loudspeakers and the like; a storage unit 540, such as disk, optical disk and the like; and a communication unit 545, such as network card, modem, wireless communication transceiver and the like. The communication unit 545 allows the device 500 to exchange information/data with other devices through computer networks such as Internet and/or various telecommunication networks.

Each procedure and processing described above, such as the example method 200, can be performed by a processing unit 505. For example, in some embodiments, the method 200 may be implemented as computer software programs, which are tangibly included in a machine-readable medium, such as storage unit 540. In some embodiments, the computer program may be partially or completely loaded and/or installed to the device 500 via ROM 510 and/or the communication unit 545. When the computer program is loaded to RAM 515 and executed by CPU 505, one or more steps of the above described example method 200 are performed. Alternatively, in the other embodiments, CPU 505 may also be configured in any other proper manner (for instance, by means of a firmware) to implement the above described process/method.

Through the above depiction, it can be seen that embodiments of the present disclosure can save limited computing resources and improve the performance of the processor significantly by classifying data blocks of the file stream based on properties of file stream and then deduplicating data blocks with obvious deduplication effect.

The present disclosure may be a method, an apparatus, a system and/or a computer program product. The computer program product may include a computer-readable storage medium having computer-readable program instructions stored thereon for executing various aspects of the present disclosure.

The computer-readable storage medium can be a tangible device capable of holding and storing instructions used by the instruction-executing device. The computer-readable storage medium can be, but not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described herein can be downloaded from the computer-readable storage medium to various computing/processing devices, or to external computers or external storage devices via network, such as Internet, local area network, wide area network and/or wireless network. The network may comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure can be assembly instructions, instructions of instruction set architecture (ISA), machine instructions, machine-related instructions, microcodes, firmware instructions, state setting data, or a source code or target code written by any combinations of one or more programming languages including object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA), for example. The electronic circuit can execute computer-readable program instructions to implement various aspects of the present disclosure.

Various aspects of the present disclosure are described in reference with the flow chart and/or block diagram of the method, device (system) and computer program product according to the embodiments of the present disclosure. It should be understood that each block in the flow chart and/or block diagram and any combinations of various blocks thereof can be implemented by the computer-readable program instructions.

The computer-readable program instructions can be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions can also be stored in the computer-readable storage medium. These instructions enable the computer, the programmable data processing device and/or other devices to operate in a particular way, such that the computer-readable medium storing instructions can comprise a manufactured article that includes instructions for implementing various aspects of the functions/actions specified in one or more blocks of the flow chart and/or block diagram.

The computer-readable program instructions can also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for performing specified functions or actions, or a combination of the dedicated hardware and the computer instructions.

Various embodiments of the present disclosure have been described above, and the above illustration is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method of deduplication, comprising:
   obtaining a property of a file stream, the property of the file stream including a file type or a magic number identifying a format of a protocol or a file;
   in response to receiving an I/O request for a data block of the file stream, assigning a deduplication level to the I/O request based on the property of the file stream at least in part by determining whether the file stream is compressed based on the property of the file stream and assigning the deduplication level based on whether the file stream is compressed, wherein the assigning of the deduplication level to the I/O request includes, in response to a determination that the file stream is uncompressed, assigning a third deduplication level to the I/O request; and
   deduplicating the data block of the file stream based on the deduplication level assigned to the I/O request, at least in part by,
   in response to the assigned deduplication level being a first deduplication level, skipping deduplication of the data block of the file stream,
   in response to the assigned deduplication level being a second deduplication level, deduplicating the data block of the file stream based on a state of an available computing resource, and
   in response to the assigned deduplication level being the third deduplication level, deduplicating the data block of the file stream.

2. The method according to claim 1, wherein assigning the deduplication level comprises:
   in response to a determination that the file stream is compressed, assigning the first deduplication level to the I/O request.

3. The method according to claim 1, wherein assigning the deduplication level comprises:
   in response to failing to determine whether the file stream is compressed, assigning the second deduplication level to the I/O request.

4. The method according to claim 1, wherein deduplicating the data block of the file stream based on the state of the available computing resource further comprises:
   in response to an amount of the available computing resource being above a predetermined threshold, deduplicating the data block of the file stream; and
   in response to the amount of the available computing resource being below the predetermined threshold, skipping deduplication of the data block of the file stream.

5. The method according to claim 1, further comprising:
   wherein assigning the deduplication level further comprises, in response to failing to determine whether the file stream is compressed, assigning a second deduplication level to the I/O request; and
   wherein deduplicating the data block of the file stream further comprises, in response to the deduplication level assigned to the I/O request being the second deduplication level, skipping deduplication of the data block of the file stream regardless of a state of an available computing resource.

6. The method according to claim 1, further comprising:
   after assigning the deduplication level to the I/O request, calculating a fingerprint of the I/O request, the fingerprint identifying the data block for the I/O request;
   storing the fingerprint in a cache; and
   in response to a fingerprint of a subsequent I/O request after the I/O request hitting the fingerprint stored in the cache, assigning a deduplication level to the subsequent I/O request, the assigned deduplication level being the same as that of the I/O request corresponding to the hit fingerprint in the cache.

7. The method of claim 6, further comprising:
   maintaining the cache such that more fingerprints of I/O requests assigned a highest deduplication level are stored in the cache than fingerprints of other I/O requests.

8. The method of claim 7, further comprising:
   maintaining in the cache a predetermined ratio between fingerprints of I/O requests assigned the highest deduplication level and fingerprints of I/O requests that are assigned at least one other deduplication level.

9. An electronic device, comprising:
   at least one processor; and at least one memory coupled to the at least one processor and having machine-executable instructions stored thereon which, when executed by the at least one processor, causing the device to perform acts comprising:
obtaining a property of a file stream, the property of the file stream including a file type or a magic number identifying a format of a protocol or a file;
in response to receiving an I/O request for a data block of the file stream, assigning a deduplication level to the I/O request based on the property of the file stream at least in part by determining whether the file stream is compressed based on the property of the file stream and assigning the deduplication level based on whether the file stream is compressed, wherein the assigning of the deduplication level to the I/O request includes, in response to a determination that the file stream is uncompressed, assigning a third deduplication level to the I/O request; and
deduplicating the data block of the file stream based on the deduplication level assigned to the I/O request, at least in part by,
in response to the assigned deduplication level being a first deduplication level, skipping deduplication of the data block of the file stream,
in response to the assigned deduplication level being a second deduplication level, deduplicating the data block of the file stream based on a state of an available computing resource, and
in response to the assigned deduplication level being the third deduplication level, deduplicating the data block of the file stream.

10. The device according to claim 9, wherein assigning the deduplication level comprises:
in response to a determination that the file stream is compressed, assigning the first deduplication level to the I/O request.

11. The device according to claim 9, wherein assigning the deduplication level comprises:
in response to failing to determine whether the file stream is compressed, assigning the second deduplication level to the I/O request.

12. The device according to claim 9, wherein deduplicating the data block of the file stream based on the state of the available computing resource further comprises:
in response to an amount of the available computing resource being above a predetermined threshold, deduplicating the data block of the file stream; and
in response to the amount of the available computing resource being below the predetermined threshold, skipping deduplication of the data block of the file stream.

13. The device according to claim 9, further comprising:
wherein assigning the deduplication level further comprises, in response to failing to determine whether the file stream is compressed, assigning a second deduplication level to the I/O request; and
wherein deduplicating the data block of the file stream further comprises, in response to the deduplication level assigned to the I/O request being the second deduplication level, skipping deduplication of the data block of the file stream regardless of a state of an available computing resource.

14. The device according to claim 9, wherein the acts further comprise:
after assigning the deduplication level to the I/O request, calculating a fingerprint of the I/O request, the fingerprint identifying the data block for the I/O request;
storing the fingerprint in a cache; and
in response to a fingerprint of a subsequent I/O request after the I/O request hitting the fingerprint stored in the cache, assigning a deduplication level to the subsequent I/O request, the assigned deduplication level being the same as that of the I/O request corresponding to the hit fingerprint in the cache.

15. A computer program product for deduplication, the computer program product comprising:
a non-transitory computer readable medium encoded with computer-executable code, the code configured for the execution of:
obtaining a property of a file stream, the property of the file stream including a file type or a magic number identifying a format of a protocol or a file;
in response to receiving an I/O request for a data block of the file stream, assigning a deduplication level to the I/O request based on the property of the file stream at least in part by determining whether the file stream is compressed based on the property of the file stream and assigning the deduplication level based on whether the file stream is compressed, wherein the assigning of the deduplication level to the I/O request includes, in response to a determination that the file stream is uncompressed, assigning a third deduplication level to the I/O request; and
deduplicating the data block of the file stream based on the deduplication level assigned to the I/O request, at least in part by,
in response to the assigned deduplication level being a first deduplication level, skipping deduplication of the data block of the file stream,
in response to the assigned deduplication level being a second deduplication level, deduplicating the data block of the file stream based on a state of an available computing resource, and
in response to the assigned deduplication level being the third deduplication level, deduplicating the data block of the file stream.

* * * * *